US012743921B2

(12) United States Patent
Scheuber et al.

(10) Patent No.: US 12,743,921 B2
(45) Date of Patent: Sep. 22, 2026

(54) REFILL STATION FOR A DISPENSER CAN WITH A SCALE FOR DETERMINING A WEIGHT INFORMATION OF THE DISPENSER CAN AT A RECEIVING DEVICE

(71) Applicant: WÜRTH INTERNATIONAL AG, Chur (CH)

(72) Inventors: Michael Scheuber, Langenbrettach (DE); Herbert Reuther, Krautheim (DE)

(73) Assignee: WÜRTH INTERNATIONAL AG, Chur (CH)

( * ) Notice: Subject to any disclaimer, the term of this patent is extended or adjusted under 35 U.S.C. 154(b) by 304 days.

(21) Appl. No.: 18/566,366

(22) PCT Filed: May 4, 2022

(86) PCT No.: PCT/EP2022/061898
§ 371 (c)(1),
(2) Date: Dec. 1, 2023

(87) PCT Pub. No.: WO2022/253507
PCT Pub. Date: Dec. 8, 2022

(65) Prior Publication Data

US 2024/0249582 A1 Jul. 25, 2024

(30) Foreign Application Priority Data

Jun. 2, 2021 (DE) ..................... 10 2021 114 323.3

(51) Int. Cl.
*G07F 13/04* (2006.01)
*B65B 3/28* (2006.01)
(Continued)

(52) U.S. Cl.
CPC ................ *G07F 13/04* (2013.01); *B65B 3/28* (2013.01); *B65B 31/003* (2013.01); *G07F 7/0609* (2013.01)

(58) Field of Classification Search
CPC .............. B65D 1/06; B65D 83/42; B65B 3/28
(Continued)

(56) References Cited

U.S. PATENT DOCUMENTS

| | | | | |
|---|---|---|---|---|
| 8,844,584 | B1 | 9/2014 | Haley et al. | |
| 10,846,975 | B2 * | 11/2020 | Tansey, Jr. | B65B 31/00 |

(Continued)

FOREIGN PATENT DOCUMENTS

| | | |
|---|---|---|
| DE | 199 10 003 A1 | 9/2000 |
| JP | H06100096 A | 4/1994 |

(Continued)

OTHER PUBLICATIONS

International Search Report of PCT/EP2022/061898, Sep. 6, 2022, 6 pages.

(Continued)

*Primary Examiner* — Timothy P. Kelly
(74) *Attorney, Agent, or Firm* — Womble Bonds Dickinson (US) LLP

(57) ABSTRACT

Refill station comprising a receiving device for receiving a dispenser can which is to be refilled with an active substance, a scale for capturing a weight information which is related to the dispenser can at the receiving device prior to a refill process and/or during a refill process, and a control unit which is configured for controlling a refill of the dispenser can with the active substance based on the determined weight information.

17 Claims, 4 Drawing Sheets

(51) Int. Cl.
*B65B 31/00* (2006.01)
*G07F 7/06* (2006.01)

(58) Field of Classification Search
USPC .................. 141/18–20, 83, 113, 311 R, 312, 141/351–356, 363, 383–386
See application file for complete search history.

(56) References Cited

U.S. PATENT DOCUMENTS

| | | | |
|---|---|---|---|
| 2004/0045984 | A1 | 3/2004 | Schuman et al. |
| 2015/0375984 | A1 | 12/2015 | Arcand |
| 2017/0314733 | A1 | 11/2017 | Tilhof |

FOREIGN PATENT DOCUMENTS

| | | | |
|---|---|---|---|
| JP | H10296204 | A | 11/1998 |
| JP | 2005096874 | A | 4/2005 |
| JP | 2008094496 | A | 4/2008 |
| JP | 2013522586 | A | 6/2013 |
| JP | 2017534035 | A | 11/2017 |

OTHER PUBLICATIONS

Japanese Office action for Application No. 2023-565558, dated Oct. 1, 2024, 5 pages.

* cited by examiner

REFILL STATION FOR A DISPENSER CAN WITH A SCALE FOR DETERMINING A WEIGHT INFORMATION OF THE DISPENSER CAN AT A RECEIVING DEVICE

CROSS-REFERENCE TO RELATED APPLICATIONS

This application is a national US phase of PCT/EP2022/061898, filed May 4, 2022, which claims the benefit of the filing date of the German Patent Application No. 10 2021 114 323.3 filed 2 Jun. 2021, the disclosure of which is hereby incorporated herein by reference.

TECHNICAL FIELD

The disclosure relates to a refill station, a refill arrangement, and a method for operating a refill station.

Technological Background

Dispenser cans are known which are automatically refillable by a refill station. Such a known refill station is the REFILLO®mat station of the applicant Würth. This secure and economical system is based on the automatic refill of empty dispenser cans with an active substance and pressure air. This enables to fill dispenser cans with active substances from large containers (German: Großgebinden) (for example canisters or barrels). For this purpose, the dispenser cans for the individual active substances are pushed on the corresponding refill station. Then, a refill of the dispenser can with the active substance and pressure air in a pregiven ratio is performed. To exclude a confusion of the dispenser can and an assigned active substance, the can reception is mechanically encoded, such that only the correct dispenser can can be mechanically attached on the correct can reception. Thereby, only a mechanically fitting dispenser can can be used with the assigned refill station. A confusion of active substances and dispenser cans, which may be dangerous under certain circumstances, is therefore mechanically suppressed.

SUMMARY OF THE DISCLOSURE

There may be a need to provide a refill station for refilling a dispenser can with a high accuracy.

This need is met by the subject-matters with the features according to the independent patent claims. Further embodiments are shown in the dependent claims.

According to an embodiment of the present invention, a refill station is provided which comprises a receiving device for receiving a dispenser can to be refilled with an active substance, a scale for capturing a weight information which is related to the dispenser can at the receiving device (in particular to the dispenser can with the receiving device) prior to a refill process and/or during a refill process, and a control unit which is configured for controlling a refill of the dispenser can with the active substance based on the captured weight information.

According to another embodiment of the present invention, a refill arrangement is provided comprising a refill station with the above described features and a dispenser can which is attachable or attached to the receiving device, wherein, by the scale, a weight information which is related to the dispenser can at the receiving device (in particular to the dispenser can with the receiving device) is capturable, when the dispenser can is attached to the receiving device.

According to yet another embodiment of the present invention, a method for operating a refill station is provided, wherein the method comprises receiving a dispenser can which is to be refilled with an active substance at a receiving device of the refill station, capturing a weight information which is related to the dispenser can at the receiving device (in particular to the dispenser can with the receiving device) prior to a refill process and/or during a refill process by a scale, and controlling a refill of the dispenser can with the active substance based on the captured weight information.

In the context of the present application, a "refill station" may in particular denote an apparatus which is configured for refilling a dispenser can which is at least partially empty and mechanically and fluidically couplable with the refill station with an active substance from an active substance container (German: Wirkstoffgebinde) to be connected. A refill station may therefore provide a fluidic connection between a container for providing the active substance to be refilled and the dispenser can to be refilled, and optionally for providing a pressure gas to be refilled at the dispenser can.

In the context of the present application, a "receiving device" may in particular denote a mechanical and fluidic adapter which is configured for receiving, in particular in a form-locking manner, a dispenser can to be refilled, and can provide the active substance and/or a pressure gas to the dispenser can in the received state. Beyond the mechanical adapter function, the receiving device may also function as a fluidic adapter for providing a fluid connection between a container with the active substance and the dispenser can to be refilled with the active substance.

In the context of the present application, a "dispenser can" (German: Spenderdose) (for example configured as aerosol can) may in particular denote a can which is handable by a user, which is configured for discharging (in particular for spraying a spray mist or for discharging an active substance in form of an active substance beam, a foam, or a gel) preferably liquid active substance. This active substance is pressurized in an interior of the dispenser can, wherein pressure gases or propellant gases in the dispenser can (for example propane, butane, compressed air, carbon dioxide, helium, or oxygen) may be used for discharging the active substance from the dispenser can. Through a nozzle, the ingredients (in particular the active substance or an active substance-propellant gas-mixture) can be sprayed, dispensed, and/or discharged in another form out of the aerosol can. In particular, a medium which is located in the aerosol can, can be sprayed out of the aerosol can as an aerosol.

In the context of the present application, an "active substance" may in particular denote a medium which, in a state sprayed out of the dispenser can, provides the actual function of the dispenser can. Such an active substance may comprise a liquid, a gel, a viscous medium, and/or a gas, optionally comprising solid particles. For example, such an active substance may be a cleaning agent (for example a brake cleaning agent), a rust remover, a maintenance oil, a silicone spray, a windows cleaning agent, a leakage detection medium, a welding spray, etc. In a refill station, such an active substance may be refilled from a container (for example a canister) into a dispenser can to be refilled.

In the context of the present application, a "control unit" may in particular denote a unit which controls the process of refilling the active substance into a dispenser can, in particular allows it in a defined manner or prevents it in an error case. In particular, such a control unit may comprise at least one processor and/or a part of a processor which evaluates a provided information about an intended and/or performed refill process and, if necessary, performs, adapts, restricts, extends, or prevents the refill process. In particular, for this purpose, the control unit may control or regulate individual components of the refill station.

In the context of the present application, a "scale" (German: Waage) may in particular denote an apparatus which may perform a mass determination or weight determination or may provide data which are indicative for the mass or the weight. The measurement of the mass of one or more bodies by a scale may be performed by the measurement of the weight force of the one or more bodies. According to embodiments of the invention, the scale may be configured for determining the mass or the weight of a dispenser can which is mounted at the receiving device, in particular the weight of the dispenser can (further in particular its empty weight) plus the weight of the receiving device. However, in embodiments, it is also possible to determine the weight of the receiving device with the dispenser can and with its partial or complete filling with the active substance and/or the pressure gas by the scale. In particular, in embodiments, it is possible to determine the weight of the dispenser can which is empty or partially filled or completely filled with the active substance and/or the pressure gas with at least a part of the refill station, in particular with its receiving device, by the scale.

In the context of the present application, a "weight information which is related to the dispenser can at the receiving device" may in particular denote an information which is captured by the scale when the dispenser can is located at the receiving device and is subjected to weighting by the scale. Such a weight information may be provided in form of raw measuring data which are detected at the scale or in form of processed measuring data of the scale. Furthermore, such a weight information may relate to a weight of the (for example completely emptied) dispenser can or to a weight of the (for example only partially filled or completely filled) dispenser can with its filling with the active substance and/or the pressure gas, respectively preferably additionally with a weight of the receiving device or a part of it.

According to an exemplary embodiment of the invention, prior to and/or during the performance of a refill of a dispenser can which was previously at least partially emptied with an active substance and/or with a pressure medium, a mass determination or weight determination is performed which is indicative for the weight or the mass of the dispenser can which is mounted at a receiving device of a refill station. In this way, it is possible to precisely and correctly control a refill process in compliance with the detected weight information. In particular, on basis of the weight information which is detected by a scale in a simple and nevertheless accurate manner, an actual degree of filling of the dispenser can may be determined, and the refill process may be controlled in a corresponding manner. Thereby, with a low metrological and structural effort, both an undesired only partial refill and a possibly dangerous overfilling of the dispenser can may be avoided. An only partial refill means that the intervals between two refills of the dispenser can are unnecessarily shortened for a user in a cumbersome manner. In case of an overfilling of the dispenser can, there may be a risk of bursting which may be connected with a risk of injuring a user and a destruction of the dispenser can. By performing a refill process of a refillable dispenser can using a refill station based on an actual weight information about the dispenser can to be refilled at the receiving device, with a distinct user convenience, a high operational safety in the refill operation can be guaranteed. By capturing a weight information about the dispenser can in a state mounted at a receiving device by a scale, and by thereby enabling a conclusion to an amount of the active substance and/or the pressure gas which, during a refill process, shall be refilled in a previously at least partially emptied dispenser can, a sometimes difficult and/or imprecise flow measurement of the active substance and/or the pressure gas for a quantification of the filling amount of the dispenser can may be dispensable. Advantageously, a weight capturing may be performed by the scale in a state in which the dispenser can is attached to the receiving device. The weight of the receiving device which is then included in the weight capturing, may be mathematically taken into account or eliminated and therefore does not falsify the weight evaluation for controlling a refill process of the dispenser can. A user merely needs to place the dispenser can on the receiving device, the rest is performed by the scale and the control unit.

In the following, additional exemplary embodiments of the refill station, the refill arrangement, and the method are described.

According to an embodiment, a scale-based quantification of the filling of a dispenser can as described above may be combined with a flow measurement, to further improve the accuracy and/or the base of data for the determination of a degree of filling of the dispenser can.

According to an exemplary embodiment, the scale may be arranged below the receiving device, and the dispenser can, in a state received at the receiving device, may be arranged in an upright manner. In other words, the dispenser can may be mounted on a receiving device which is arranged below in a standing manner which is especially intuitive for a user, which receiving device may in turn be arranged above a scale. Then, the receiving device on which the dispenser can is arranged acts upon the scale. Such an embodiment is illustrated in FIG. 9.

According to another exemplary embodiment, the scale may be arranged above the receiving device, and the dispenser can, in a state received at the receiving device, may be arranged upside down. Descriptively, the dispenser can may be arranged in a suspending manner, wherein above the dispenser can a receiving device which is receiving it may be arranged, which in turn is arranged below a scale. Then, the receiving device acts upon the scale, under which receiving device the dispenser can is arranged. Such an embodiment is shown by FIG. 10.

According to an exemplary embodiment, the scale may be a beam scale (German: Balkenwaage). A beam scale may be denoted as a weighting device which is formed of a horizontal beam which is movably mounted at a horizontal axis. A beam scale which is used according to an exemplary embodiment of the invention may comprise an asymmetrical, two-armed lever which is rotatably mounted in the center above the center of gravity, which is loaded at one end with the receiving device with the dispenser can mounted to it, and at the other end with a reference mass or the like. According to other embodiments, other scales may be used, for example a spring scale.

According to an exemplary embodiment, the scale may comprise a securing mechanism which is configured for a protection against an overload of the scale. Such a securing mechanism protects the refill station against a too high weight exertion which could damage the components of the refill station. For example, the securing mechanism may comprise a double leaf spring which is attached to an end of a weighting beam of the scale which is opposing to another end of the weighting beam, wherein the other end, in a state received at the receiving device, is force-coupled with the receiving device and the dispenser can. Such a provision secures the scale if an excessive weight is exerted on it. Thereby, a mechanically robust refill station may be provided.

According to an exemplary embodiment, the control unit may be configured for determining a residual filling of the dispenser can prior to a refill process, based on a weight information which is determined prior to the refill process by the scale, and for controlling the refill process based on this weight information, in particular for avoiding an overfilling of the dispenser can. By, prior to performing a refill of the previously only partially emptied dispenser can, performing a determination of its residual filling, a subsequent refill process may be precisely adjusted, such that after finishing a refill process of the dispenser can, neither an underfilling nor an overfilling is to be suspected. For determining the residual filling of an only partially emptied dispenser can, for example in case of a pre-known weight of the receiving device which is receiving the dispenser can and a pre-known empty weight of the dispenser can, a weight of the dispenser can with the partial filling and the receiving device may be determined by the scale, and the weight of the receiving device and the empty weight of the dispenser can may be subtracted from it. The empty weight of the dispenser can may either be pre-known or may be determined by an identification of the dispenser can, for example by reading the dispenser can-data which are characterizing the dispenser can out of a dispenser can transponder of the dispenser can by a transponder reading device at the receiving device.

According to an exemplary embodiment, the control unit may be configured for determining the weight information by the scale during a refill process, and for subsequently continuing the refill process based on this weight information. For example, the weight of the dispenser can (for example in combination with a weight of the receiving device and/or at least another component of the refill station) may be captured continuously or in time intervals while performing the refill process, and thereby the refill progress may be determined. This enables at each point in time an accurate control or a tracing (German: Nachführung) of the remaining part of the refill process. In particular, by tracking the respective refill progress, also the prediction of the remaining refill process by extrapolating may be possible, whereby the precision of the refill process may be further increased.

According to an exemplary embodiment, the control unit may be configured for controlling a refill process based on a differential weight determination of the dispenser can which is performed by the scale at the receiving device prior to the refill process and after at least a part of the refill process, in particular based on an actual-target comparison. When a starting weight of a completely emptied dispenser can or a starting weight of an only partially emptied dispenser can and its residual filling is known or was metrologically determined to the beginning, a differential weight determination prior to and during and/or at the end of a refill process is sufficient to correctly continue the refill process and/or to terminate the refill process at the correct point in time. The weight determination prior to and after the refill process may be performed by the scale in a simple manner. A possible residual filling of the dispenser can at the beginning of the refill process may be determined by a weight determination of the dispenser can at the receiving device prior to performing the refill process, when the empty weight of the receiving device is known or measured, and the empty weight of the dispenser can is known or determined.

According to an exemplary embodiment, the scale may be configured for capturing a weight information which is indicative for a sum weight of the dispenser can, a residual filling of the active substance in the dispenser can, and a part of the refill station (in particular the receiving device), prior to a refill process and/or during a refill process, wherein the control unit is configured for controlling the refill of the dispenser can with the active substance based on the captured weight information. With advantage, the simple determination of the mentioned sum weight is sufficient to determine a lacking amount which is to be refilled for a complete refill of the dispenser can, in combination with individual weights which are pre-known (for example the receiving device, the empty weight of the dispenser can) and/or detectable (in particular using a transponder at the dispenser can) and/or determinable by the scale (for example the receiving device without the dispenser can). Then, an isolated weight determination of a dispenser can which is for example partially filled may be dispensable, which can make an elaborate attachment of the scale directly at the dispenser can dispensable. Instead, for example, the scale may be directly attached to the receiving device and therefore only indirectly to the dispenser can, which is structurally simpler.

According to an exemplary embodiment, the refill station may comprise a transponder reading device for reading dispenser can-related data of a dispenser can transponder which is attached to the dispenser can, when the dispenser can is attached to the receiving device, wherein the control unit is configured for controlling the refill of the dispenser can with the active substance based on the read dispenser can-related data. In particular, the transponder reading device may be configured for reading dispenser can-related data which are indicative for an empty weight of the dispenser can, an active substance to be filled into the dispenser can, and/or a maximum filling amount of the dispenser can. For example, a RFID-tag may be attached to the dispenser can as a dispenser can transponder and may be read by a transponder reading device which is for example configured as a RFID-reading device of the refill station. In the dispenser can transponder which is assigned to the dispenser can, dispenser can-related data may be stored, for example an empty weight of the dispenser can, a maximum filling amount of the dispenser can, and an information about an active substance which is to be received into the dispenser can (for example its density). In particular, this information may be used when performing a differential weight determination as a basis for controlling a refill process for refilling the dispenser can with the active substance and/or the pressure gas.

Alternatively or additionally, as a basis for controlling a refill process of the dispenser can for refilling with the active substance and/or the pressure gas, active substance container-related data may be read from an active substance container transponder (for example a further RFID-tag) which is associated with an active substance container which provides the active substance which is to be refilled into the dispenser can. For example, the active substance container-related data may deliver an information about the active substance to be refilled into the dispenser can, for example its density. The active substance container-related data may be read by a transponder reading device of the refill station. In particular, this information may be used when performing a differential weight determination as a basis for controlling a refill process for refilling the dispenser can with the active substance and/or the pressure gas.

According to an exemplary embodiment, the receiving device may comprise a receiving side for receiving the dispenser can and a weighting side which is opposing to the receiving side, to which the scale and a supply terminal for supplying the active substance and/or the pressure gas to the dispenser can, which is to be received at the receiving side, are attached. By arranging both the scale and the supply terminal for supplying a medium to a dispenser can to be refilled at a weighting side of the receiving device which is opposing to a receiving side for attaching the dispenser can at the receiving device by a user, the scale and the supply terminal are arranged in a manner protected against mechanical influences when attaching the dispenser can at the receiving device by a user. Thereby, the refill station withstands also harsh conditions in operation, without the weight determination function and the provision of medium to a dispenser can being impeded.

According to an exemplary embodiment, the receiving device may comprise a protrusion at the weighting side, to which protrusion the scale is attached, and which delimits a recess through which the supply terminal is guided. For example, the protrusion may be formed by multiple pins or as a ring-protrusion. The rigid protrusion serves for force-coupling the scale with the receiving device which enables a determination of a weight information which is indicative for a dispenser can weight. At the same time, the protrusion circumferentially delimits a recess in which a fluidic interface is received in a protected manner in form of the supply terminal for supplying the medium (in particular the active substance and/or the pressure gas) to the receiving device and from there to a dispenser can which is received at the receiving device. The described configuration is space-saving and enables a precise weight determination and at the same time a supply of medium and is insensitive against pressure impacts when placing a dispenser can to be refilled on the receiving device.

According to an exemplary embodiment, the control unit may be configured, based on capturing a weight information by the scale, for determining a residual amount of the active substance in the dispenser can prior to a refill process, and for correspondingly controlling a subsequent refill process. In particular, a determination of a residual filling of a dispenser can to be refilled on basis of a weight determination enables a precise determination of an amount of the active substance and, if necessary, of the pressure gas which is to be refilled into the dispenser can with the residual filling.

According to an exemplary embodiment, the refill arrangement may comprise an active substance container which contains the active substance and which is coupled or couplable with the receiving device, for providing the active substance for refilling the dispenser can. For example, such an active substance container may be a canister or a barrel, for example with a receiving volume of the active substance in a range from 5 I to 100 I, in particular in a range from 5 I to 80 I.

According to an exemplary embodiment, the refill arrangement may comprise a gas reservoir which is configured for providing the pressure gas and which is coupled or couplable with the receiving device, to provide the pressure gas for refilling the dispenser can. For example, such a gas reservoir may be a pressure gas container or a terminal to a pressure gas conduit. If the dispenser can is formed as BoV (Bag-on-Valve)-dispenser can, in which the pressure gas is permanently contained and does not leak when discharging the active substance out of the dispenser can, a pressure gas reservoir for refilling the pressure gas into a dispenser can may be dispensable.

In the following, exemplary embodiments of the present invention are described in detail with reference to the following figures.

DETAILED DESCRIPTION OF EXEMPLARY EMBODIMENTS

Same or similar components in different figures are provided with the same reference numbers.

Figure 1:
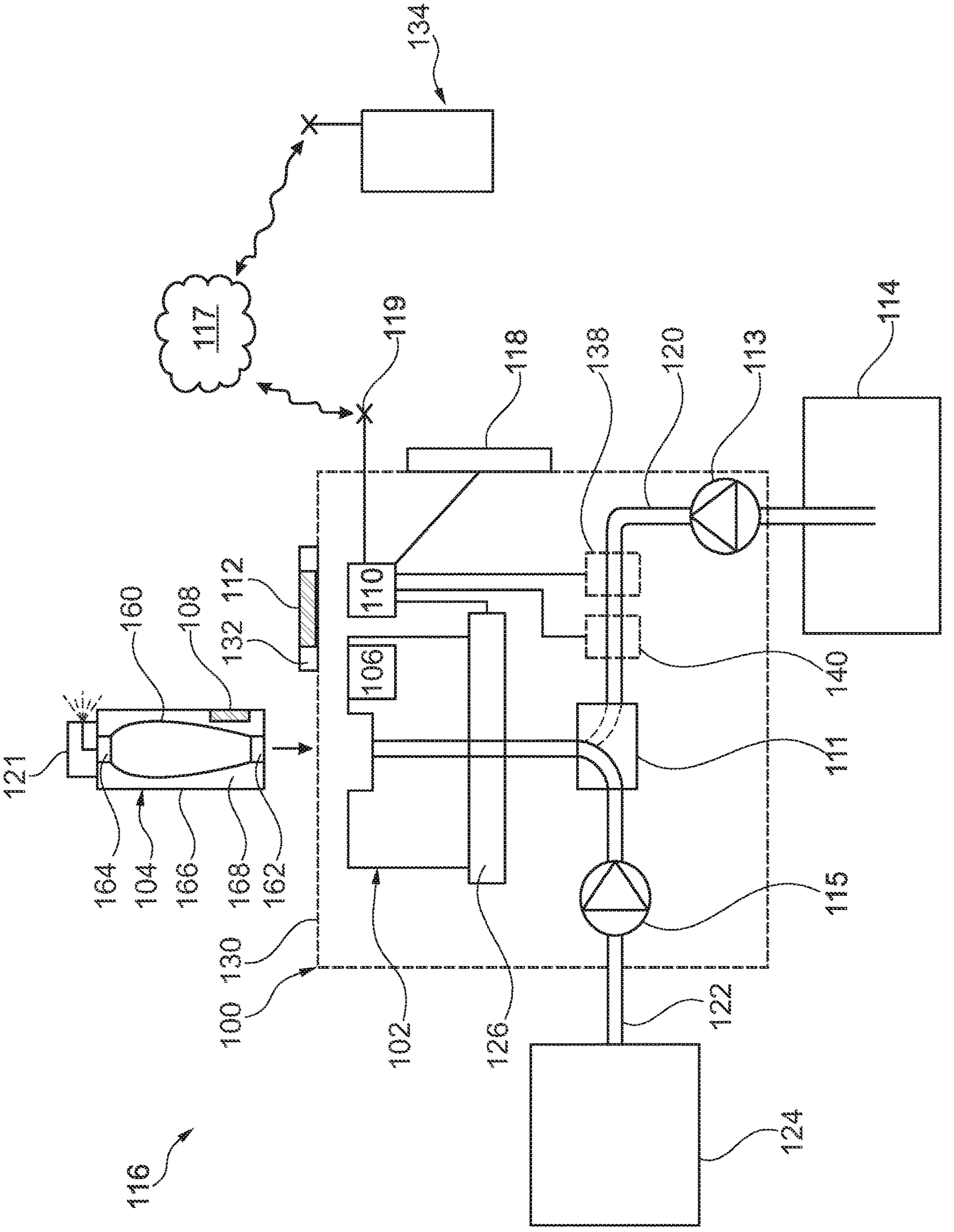
FIG. 1 shows a refill arrangement with a refill station, an active substance container, and a dispenser can, according to an exemplary embodiment of the invention.

Before, referring to the figures, exemplary embodiments of the invention are described, some general aspects of embodiments of the invention shall be explained.

According to embodiments of the invention, a refill station is provided which uses an active substance from a container (for example a 20 I canister or a 60 I barrel), to fill or refill a dispenser can. For example, the dispenser can may be an aerosol can with a filling valve at its bottom side. Furthermore, a mechanical code may be formed at the bottom side of the dispenser can which corresponds to a respective shape of a receiving device of the refill station. Moreover, the dispenser can may comprise a spraying valve for discharging an active substance and/or a medium out of the dispenser can at its top side.

The filling station may comprise a fluid connection to a container from which the active substance is filled into the dispenser can to be refilled. For example, such a fluid connection may be formed by a tube, to supply the active substance and/or the medium to a dispenser can from the container of the refill station. Preferably, such tubes are capable for a ESD-removal (ESD=electrostatic discharge). In particular, the refill station may comprise a receiving device or an attachment unit (German: Aufsetzeinheit) for the dispenser can with a mechanical code, for enabling only mechanically fitting encoded dispenser cans on a corresponding refill station. Furthermore, a fastener may be provided at the receiving device, to hold the dispenser can at the receiving device during its refill. Preferably, the dispenser can, regardless of its angular position to the receiving device, i.e. descriptively freely positionable around 360°, may be configured rotatable around the longitudinal axis on the coding plate (German: Kodierteller), without impeding the correct connection between the dispenser can and the receiving device. Optionally, the refill station may be equipped with a pressure air terminal (wherein pressure air is available in each car repair shop, for example), to fill pressure air into the dispenser can together with the active substance. The control of the filling process may be performed by a control unit. For example, when filling a dispenser can, firstly the active substance and subsequently a pressure medium (for example pressure air) may be conveyed. Both may be controlled, for example pneumatically, by a three way valve. For this purpose, the refill station may be equipped with a piston with a cylinder (for example a stainless steel cylinder or a plastic cylinder), to receive the active substance and to fill a defined amount of the active substance into the dispenser can.

Advantageously, the refill station may be connected to an electrical potential equalization, since the friction of the active substance when refilling may lead to an electrostatic charging. For example, a mounting of a refill station in a shelf may be performed, wherein in the shelf, at least one container (for example a canister, for example with a volume of 20 I) may be arranged. It is also possible to form a refill station with a placing part (German: Aufsatz) on an active substance barrel (for example with a volume of 60 I), or in a hazardous goods storage cupboard as a ballast adapter (German: Auflastadapter). A suitable potential equilibration may be achieved by grounding.

According to an exemplary embodiment of the invention, for providing a refill station for refilling the active substance and/or the pressure medium into a dispenser can at a receiving device which is receiving the dispenser can in the refill operation, a scale is mounted. The scale is configured for capturing a weight information prior to and/or during a refill process, which is indicative for an actual mass and/or an actual weight of a dispenser can which is actually completely emptied, partially filled, or completely filled, at the receiving device. In particular, the weight information which is captured by the scale may enable to determine an actual filling state of the dispenser can and, on this basis, to determine how the refill process shall be performed or continued, to achieve a target filling state of the dispenser can. With advantage, by a scale-based and/or weight-controlled refill of a dispenser can both an undesired underfilling and a dangerous overfilling of the dispenser can may be avoided. Therefore, a refill process may be performed both in an operational safe manner and under avoidance of unnecessary short refill intervals between subsequent refill procedures for refilling a dispenser can with the active substance and/or the pressure medium and may therefore be performed in a user-convenient manner.

According to an exemplary embodiment of the invention, a scale at a receiving device of a refill station for refilling a refillable dispenser can with the active substance and/or the pressure gas measures the weight and/or the mass of the dispenser can which is formed as an aerosol can, for example, prior to and during the filling process. In particular, thereby the amount of the medium (in particular the active substance and/or the pressure medium) which is introduced into the dispenser can may be measured by a scale which is configured as a beam scale, for example. Advantageously, a filling amount limitation may be achieved by performing a weighting process when filling the dispenser can. According to a preferred embodiment, the control and/or the regulation of the refill process by a control unit allows a controlled filling of a dispenser can under performing a target-/actual comparison. For example, by the scale, an actual filling of the dispenser can may be determined and compared with a target filling. The refill process may then be continued until the actual filling has reached the target filling and may then be finished. Prior to or at the beginning of a refill process, a residual amount of the active substance and/or the pressure gas which is possibly present in the dispenser can which is configured as an aerosol can, for example, may be measured. The refill process may be adapted to this weight information.

Especially advantageously, the scale of the refill station may be configured for determining a weight and/or a mass of the medium (in particular the active substance and/or the pressure gas) in the dispenser can, of the dispenser can itself (which is configured as an aerosol can, for example), and of a refill device (in particular of a refill device at which the dispenser can to be refilled is received for refilling). This configuration has the advantage that it is not necessary to use complicated means for exactly determining only the weight of the dispenser can itself. Instead, for example under performance of a differential weight determination of a, for example pre-known, dispenser can with a, for example pre-known, empty weight and/or a, for example pre-known, residual filling prior to a filling process and during a filling process and/or at different times during a filling process, an information about the dispenser can may be derived, also when the weight determination is performed with the receiving device. This simplifies the configuration of the scale since it may then be attached at the receiving device in a simple manner and does not have to be arranged directly at the dispenser can in a complicated manner.

FIG. 1 shows a refill arrangement 116 with a refill station 100, an active substance container 114, and a dispenser can 104 according to an exemplary embodiment of the invention. The refill arrangement 116 serves for filling or refilling a dispenser can 104 which is entirely or partially empty or emptied with an active substance (for example a brake cleaner), for being able to fill the dispenser can 104 with an assigned active substance by a user in a simple manner. The active substance may then be sprayed, or more generally being discharged, out of the dispenser can 104 at a location of use. After evacuating or re-evacuating the dispenser can 104, the dispenser can 104 may then be filled again at the refill arrangement 116 with a new active substance, etc.

For this purpose, the refill station 100 comprises a receiving device 102 which acts as a dispenser can adapter for receiving a dispenser can 104 in a form-locking and fluid-coupling manner which is to be refilled with an active substance. The receiving device 102 may be configured as a coding plate which has a mechanical interface which is shape-adapted to a corresponding mechanical interface of the dispenser can 104 to be refilled. In this way, only mechanically fitting dispenser cans 104 can be attached at the receiving device 102, which makes an erroneous operation improbable. Despite this is not illustrated in FIG. 1, at the receiving device 102, a fastener unit may be attached, by which a dispenser can 104 which is attached to the receiving device 104 can be fastened at the receiving device 102 during filling. In this way, it can be excluded that during refilling, a pressure which is exerted on the dispenser can 104 or acting forces lead to an undesired release of the dispenser can 104 from the receiving device 102. After the finished refill, the fastening unit may either automatically release the dispenser can 104 or can be transferred in a state which is releasing the dispenser can 104 by a user actuation.

A user may then remove the refilled dispenser can 104 from the receiving device 102 and bring it to a location of use.

Furthermore, the refill arrangement 116 may comprise the active substance container 114 which, for example as canister or barrel, may be filled with an active substance to be refilled (for example brake cleaner). Therefore, the active substance container 114 contains the active substance which is to be refilled into the dispenser can 104 and may be fluidically coupled or couplable with the receiving device 102, to provide the active substance for refilling the dispenser can 104.

If the dispenser can 104—different than in FIG. 1, see description below—is not a BoV (bag-on-valve) —dispenser can with a pressure medium which is permanently contained therein, the refill arrangement 116 may further comprise a gas reservoir 124 which is configured for providing pressure gas and which is fluidically coupled or couplable with the receiving device 102. In this way, by the gas reservoir 124, pressure gas (for example pressure air) for refilling into the dispenser can 104 may be provided. For example, the gas reservoir 124 may be a terminal to a pressure gas conduit or a pressure gas bottle in which gas under overpressure is contained.

As illustrated in FIG. 1, at least one valve 111 which is configured as a three way valve in the illustrated embodiment may form a fluid connection between the active substance container 114, the optional pressure gas reservoir 124, and the receiving device 102. As shown, the receiving device 102 may be fluidically coupled with an active substance supply unit 120 for supplying the active substance from the active substance container 114 in a dispenser can 104 which is received at the receiving device 102. Furthermore, the receiving device 102 may be fluidically coupled with an optional pressure gas supply unit 122 for supplying the pressure gas from the gas reservoir 124 into the dispenser can 104 which is received at the receiving device 102. For example, the at least one valve 111 may be controlled by a control unit 110, such that at first only the active substance is filled into the at least partially empty dispenser can 104, before the at least one valve 111 is switched, such that subsequently only pressure gas from the gas reservoir 124 is filled into the dispenser can 104. Thereby, it can be ensured that a predefined amount of the active substance is filled into the dispenser can 104. Between the active substance container 114 and the receiving device 102, a conveying unit 113, for example a pump, may be arranged, for conveying the active substance from the active substance container 114 to the receiving device 102 and from there into the dispenser can 104. Optionally, also between the gas reservoir 124 and the receiving device 102, a conveying unit 115, for example a compressor or a pump, may be arranged.

FIG. 1 shows with an arrow how the dispenser can 104 is placed on the receiving device 102. In a bottom region of the dispenser can 104 in the region of its refilling valve 162, the dispenser can 104 is equipped with a dispenser can-transponder 108, for example a RFID-tag. At said bottom region, the dispenser can 104 is received at the receiving device 102. Such a dispenser can-transponder 108 which is able to communicate in a contactless manner, may be glued on the dispenser can 104 as a label, for example, or can be attached or embedded at and/or in a can housing 166. In a solid body memory of the dispenser can-transponder 108, dispenser can related data are stored which for example can identify or characterize the dispenser can 104 and an active substance which is to be filled in it, and/or may contain an information about a receiving volume of the dispenser can 104, an information about desired pressure gas properties in the dispenser can 104, an information about a user of the dispenser can 104, etc.

In the receiving device 102, a transponder-reading device 106 for reading the dispenser can related data of the dispenser can-transponder 108 which is attached to the dispenser can 104 in a contact-free manner is arranged. The transponder-reading device 106 is arranged in a region of the receiving device 102 such that the dispenser can 104 is only located in a reading region of the transponder-reading device 106 when the dispenser can 104 is attached to the receiving device 102. Thereby, it is advantageously ensured that erroneous reading processes of dispenser cans 104 by the transponder-reading device 106 which are located in a larger environment of the transponder-reading device 106 are reliably prevented. For this purpose, the transponder technology on whose basis the transponder-reading device 106 and the dispenser can-transponder 108 communicate, may be configured as a short-range transponder technology, for example with a range of below 10 cm, in particular below 5 cm (for example as short-range RFID-technology). Thereby, the dispenser can related data of the dispenser can-transponder 108 may be selectively read by the transponder-reading device 106 only when the dispenser can 104 is attached to the receiving device 102. The read data may be supplied from the transponder-reading device 106 to a control unit 110 or may be stored in a not illustrated electronical mass storage of the refill station 100.

Preferably, also the active substance container 114 is provided or associated with an active substance storage-transponder 112 (not shown). In a solid body memory of the active substance container-transponder 112, active substance container related data are stored which are selectively readable by the transponder-reading device 106, when the active substance container-transponder 112—as shown—is attached to a housing 130 of the refill station 100. To enable or to simplify the readability of the active substance container-transponder 112 by the transponder-reading device 106, the active substance container-transponder 112 may be configured as a label 132 which is separable from the active substance container 114 in a defined manner. For example, the label 132 may be configured as an adhesive label which is equipped with the active substance container-transponder 112, which a user can separate from the active substance container 114 which is for example configured as a canister and can be glued to a position which is provided for this purpose (and which is for example correspondingly marked) at the housing 130. By attaching or adhering or alternatively providing, the active substance container-transponder 112 can be brought into the readability distance of the transponder-reading device 106, such that the active substance container related data can be read by the transponder-reading device 106. By the fact that also the active substance container-transponder 112 firstly must be transferred by a defined user activity into the readability distance of the transponder-reading device 106, before the active substance container related data can be captured by the transponder-reading device 106, a reliable protection against reading false active substance container related data is provided. For example, the active substance container related data may contain an information about the active substance in the active substance container 114, about a filling amount or residual filling amount in the active substance container 114, an information about a dispenser can 104 or the refill station 100 which is suitable for this active substance, etc.

The control unit 110 can evaluate the dispenser can related data and the active substance container related data which are provided to it by the transponder-reading device 106, and can examine them, for example with respect to their compatibility. In particular, the control unit 110 can be determined from the data which are read by the transponder-reading device 106, if the active substance which is provided by the active substance container 114 fits into the dispenser can 104 which is received at the receiving device 102. In this way, the operational safety can be increased, since it can be excluded that a dispenser can 104 which is unsuitable for a, for example dangerous, active substance (which for example comprises gasoline and is thus at the risk of fire) is used. In a corresponding manner, it can be excluded, that an active substance which origins from an unreliable source is permitted for the refill of a dispenser can 104. Even when a user manipulates the shape of a dispenser can 104, to mount it on a receiving device 102 regardless the incompatibility of an active substance container 114 which is fluidically coupled with the receiving device 102, this may be recognized by the control unit 110 by reading the dispenser can-transponder 108. Filling a dispenser can 104 which is unsuitable for a certain active substance may thus be reliably avoided by the described transponder-configuration. Thereby, a high operational safety can be achieved when using the refill arrangement 116. If the dispenser can related data and the active substance container related data show a compliance, the refill process is triggered or permitted by the control unit 110, in other cases, the refill process is prevented or not permitted.

FIG. 1 further shows that a portable user end device 134 is communicatively coupled with a software app for a user-sided control of the refill arrangement 116 by the control unit 110. The user end device 134 may be a mobile radio device which may be communicatively coupled in a wireless manner via a communication network 117 (for example a mobile phone network or the public Internet) with a communication interface 119 of the refill station 110. Thus, a user may transmit control commands to the refill arrangement 116 or monitor the operation of the refill arrangement 116 from a remote position.

Furthermore, FIG. 1 shows that the refill station 100 comprises a display unit 118 for displaying an information, such as dispenser can related data, active substance container related data, and/or another information for a user. For example, the display unit 118 may be configured as an LCD-display or a touchscreen. By the display unit 118, during and/or after a refill process, an associated information can be shown to a user at the display unit 118.

With advantage, the refill station 100 according to FIG. 1 may comprise a scale (German: Waage) 126 which is for example configured as a beam scale (German: Balkenwaage), for capturing a weight, or a weight information which is indicative for it, of the dispenser can 104 at the receiving device 102 prior to a refill process and/or during a refill process. A weight capturing of the dispenser can 104 prior to a refill process enables to qualitatively or quantitatively determine a possible residual filling of the dispenser can 104 with the active substance and/or with a pressure gas, and to correspondingly adapt or perform a refill process which is subsequently to be performed. By considering a possible residual filling of the dispenser can 104 prior to its refill, an overfilling of the dispenser can 104 can be avoided. It is also possible to monitor the weight gain of a dispenser can 104 to be refilled during a refill process, to avoid a possible overfilling and underfilling. The control unit 110 to which the results of the weight capturing by the scale 126 can be provided, may consequently be configured to control a refill of the dispenser can 104 with the active substance based on the captured weight.

Preferably, the scale 126 may be configured for capturing a sum weight information which is indicative for a sum weight of the dispenser can 104, a residual filling of the active substance in the dispenser can 104 and a part of the refill station 100 (in particular at least a part of the receiving device 102) prior to a refill process and/or during a refill process. By the control unit 110, a refill of the dispenser can 104 with the active substance may then be controlled based on the captured sum weight information. With advantage, it may thus be dispensable to specifically capture only the weight of the dispenser can 104. It is also possible, and metrologically substantially simpler, to simply capture the mentioned sum weight, since a separation of the dispenser can 104 and the receiving device 102 during the weight determination process is then dispensable. By, prior to attaching a dispenser can 104 at the receiving device 102, capturing an empty weight of the receiving device 102 without the dispenser can 104, the residual weight which is different from the dispenser can weight of the sum weight can be mathematically subtracted, when, after attaching the dispenser can 104 to the receiving device 102, the sum weight is determined by the scale 126.

As already described, after attaching a dispenser can 104 to be refilled at the receiving device 102, by the control unit 110, a refill of the dispenser can 104 with the active substance may be permitted only when the data which are determined by the transponders 108, 112 indicate a compatibility of a dispenser can 104 which is attached to the receiving device 102 for being refilled with an active substance which is provided from a connected active substance container 114.

Alternatively or additionally, permitting a refill of a dispenser can 104 with an active substance can be made depending on the fact that an active substance which is captured at a capturing unit 138 fulfills at least one predetermined permissibility criterion. As a permissibility criterion may be used, if the active substance which is delivered in the supply unit 120 is an active substance which is permissible for the dispenser can 104, and/or if the captured active substance in the supply unit 120 fulfills an active substance origin which is considered as permissible for the dispenser can 104.

As shown in FIG. 1, by the capturing unit 138, a measurement may be performed at the active substance supply unit 120 for supplying the active substance from the active substance container 114, which measurement serves for characterizing and/or identifying the active substance which flows through the supply unit 120 which is for example configured as a tube when refilling a dispenser can 104. In this way, an active substance can be recognized which shall be used for refilling a dispenser can 104 against one or more predetermined permissibility criteria.

For example, an active substance which is permitted for refilling a dispenser can 104 may be provided with an optically recognizable marker, for example a fluorescence marker or a DNA-marker at the factory side. In this way, an active substance can be labeled which is for example permitted for refilling into a certain dispenser can 104, and/or fulfills required quality criteria. When such an active substance is conveyed through the supply unit 120, during the conveyance, by the capturing unit 138, it can be, preferably optically, recognized, if the active substance fulfills a predetermined permissibility criterion or not. For example, the permission of the filling of a dispenser can 104 with the active substance may be made depending on being able to optically capture an expected fluorescence signal by the capturing unit 138.

Data which are captured by the capturing unit 138 and which are indicative for the predetermined permissibility criterion can be supplied to the control unit 110. The control unit 110 may then allow or reject a refill of the dispenser can 104 with the active substance, namely depending on the fact, if or if not, the active substance which is captured at the capturing unit 138 fulfills the predetermined permissibility criterion. For example, an active substance may be permitted for refilling a dispenser can 104 only when a corresponding expected fluorescence marker is contained in the active substance, which for example indicates a certain active substance and/or the affiliation of the active substance to a reliable source (for example from a certain manufacturer). The examination of a predetermined permissibility criterion thus ensures a high quality of the active substance and an operational safety of the active substance in combination with the dispenser can 104.

In the illustrated embodiment, the capturing unit 138 is configured as an optical capturing unit for capturing a predetermined optical signal characteristic of the active substance to be refilled. The presence of said signal characteristic shows, that the active substance fulfills the predetermined permissibility criterion. With advantage, the capturing unit 138 may capture the active substance in the tube and/or in the supply unit 120, preferably during flowing through the supply unit 120. When the capturing unit 138 has determined the signal characteristic of the active substance candidate for refilling a dispenser can 104, this signal characteristic may be transferred to the control unit 110 for an evaluation. The control unit 110 may then, for example based on a comparison between the determined actual signal characteristic and an expected target signal characteristic, decide, if the signal characteristic indicates the fulfillment of the predetermined permissibility criterion or not. Depending on the result of this examination, the control unit 110 may then take actions to allow the refill of the dispenser can 104 with the active substance or not.

If the captured signal characteristic indicates that the active substance does not fulfill the permissibility criterion, the control unit 110 may control a prevention unit 140 for preventing the refill of the dispenser can 104 with the active substance. For example, the prevention unit 140 may press together a supply unit 120 which is configured as a flexible tube, such that no active substance can pass the supply conduit 120 anymore. Alternatively, the prevention unit 140 can introduce a curable adhesive in the supply unit 120 which is configured as a supply conduit, which chemically closes the supply conduit 120 and makes it impossible to conduct an active substance through this supply conduit 120.

The dispenser can 104 may comprise a mixture of the active substance and pressure gas in its interior, wherein, when activating an actuation nozzle 121, an active substance-pressure gas-mixture, for example as an aerosol, is discharged from or rinsed out of the dispenser can 104. In this case, for refilling the dispenser can 104, both new active substance and new pressure gas is required.

Alternatively, the dispenser can 104 may be configured as a specially configured bag-on-valve dispenser can, as illustrated in FIG. 1. The refillable dispenser can 104 which is shown in FIG. 1 serves for discharging an active substance and comprises a deformable bag 164 receiving the active substance in its interior. For example, the bag 160 may be made of plastic or a metal foil. At its bottom side, the bag 160 is fluid-tightly connected with a refill valve 162. The refill valve 162 may be placed on the receiving device 102 in a liquid-tight manner and may thereby be fluidically coupled with the refill station 100, to be able to fill or refill the bag 160 with the active substance from the active substance container 114. Moreover, the bag 160 is connected at its top side with an outlet valve 164 for user-definedly spraying the active substance out of the bag 160. The actuation nozzle 121 may be placed on the outlet valve 164, to open the outlet valve 164 by activating the actuation nozzle 121, and to thereby discharge the active substance out of the bag 160 in form of a spray.

Furthermore, the dispenser can 104 according to FIG. 1 comprises a rigid can housing 166 which receives the bag 160, with respect to which the refill valve 162 and the outlet valve 164 are exposed at the bottom side and/or at a top side. In other words, the outlet valve 164 and the refill valve 162 protrude from the rigid can housing 166 at a top side and at a bottom side. For example, the can housing 166 may be a rigid metal housing. A pressure gas may be fluid-tightly enclosed in an intermediate volume 168 between the bag 160 and the can housing 166, and can be protected against a leakage from the dispenser can 104. Therefore, it is made impossible for the pressure gas to leak through the refill valve 162 and/or through the outlet valve 164. Thus, when the active substance is sprayed through the outlet valve 164, the active substance is not mixed with the pressure gas, since the pressure gas remains in the intermediate volume 168 and thus in the dispenser can 104. Thereby, also a refill of pressure gas at the dispenser can 104 according to FIG. 1 is dispensable. Filling pressure gas into the intermediate volume 168 may be performed at the side of the manufacturer, for example, through one of the valves 162, 164 and/or through another valve in the can housing 166 (not shown).

Figure 2:
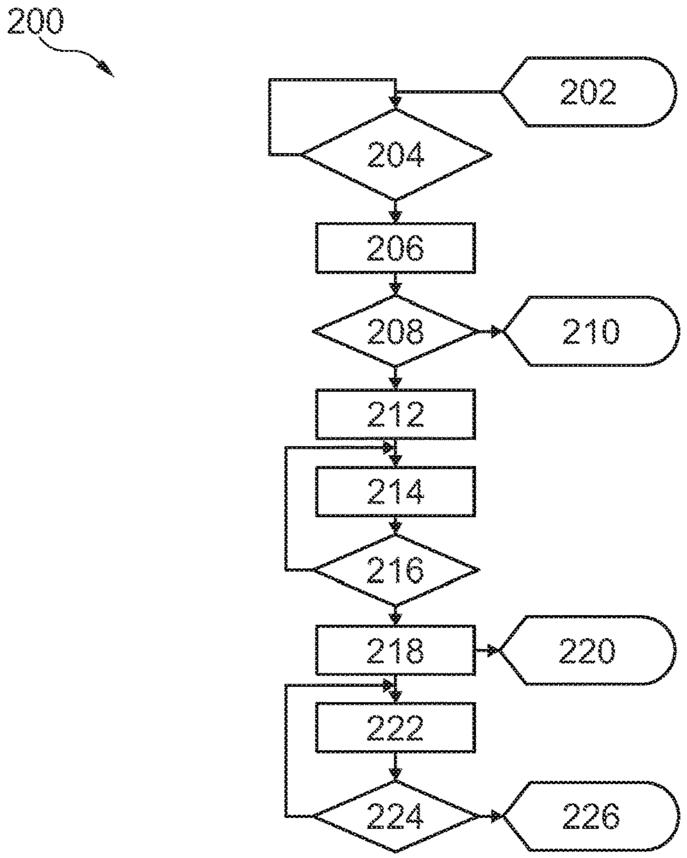
FIG. 2 shows a flow diagram which illustrates a method for operating a refill station according to an exemplary embodiment of the invention.

FIG. 2 shows a flow diagram 200 which illustrates a method for operating a refill station 100 according to an exemplary embodiment of the invention.

The method for operating a refill station 100 starts in a block 202 in which the refill station 100 indicates that it is ready for performing the method. This may be indicated at the display unit 118.

In a block 204, it is examined if a weight of a dispenser can 104 to be refilled which is captured by a scale 126 is within a predetermined range in a stable manner.

If this is the case, in a block 206, the dispenser can-transponder 108 is read by the transponder reading device 106. Furthermore, by the transponder reading device 106, an active substance container-transponder 112 can be read.

In a block 208, it is determined if an active substance and/or a medium which shall be filled into a dispenser can 104 is permissible. If this is not the case, the method concludes, that it is a false dispenser can 104, see block 210. This may be indicated at the display unit 118.

On the contrary, if this is the case, in a block 212, the residual amount of the active substance in the dispenser can 104 to be refilled is determined. Then, a pump 113 may be switched on, to deliver the active substance for a refill of the dispenser can 104 (block 214).

After refilling the dispenser can 104 with the active substance, it may be determined (for example by the scale 126) if the refilled amount of active substance in the dispenser can 104 is adequate, see block 216. If this is not the case, the method repeats the procedure according to block 214 and block 216.

On the contrary, if this is the case, the method determines in the block 218 the filling amount with the active substance and adds the entire filling amount. Corresponding to the block 220, this may be shown to a user at the display unit 118.

According to the optional block 222, the pump 115 and/or the compressor may then be switched on, to introduce pressure gas into the dispenser can 104.

In the block 224, it is examined if the pressure in the refilled dispenser can 104 is adequate. If this is not the case, the procedures according to block 222 and block 224 are examined.

On the contrary, if this is the case, the operational method is finished, see block 226. At the display unit 118, a corresponding information may be shown. An acoustic signal (for example generated by a buzzer) may indicate the completion of the operational method.

Additionally to the described procedure of filling, it is possible, prior to filling, to detect by a pressure pulse if the dispenser can 104 is correctly placed on the receiving device 102. Furthermore, after the filling, a data transmission to a communicatively coupled node is possible. It is also possible to detect if an active substance container 114 (for example a barrel or a canister) is empty. For example, this is possible by monitoring the weight course of such an active substance container 114 when filling the dispenser cans 104.

Figure 3:
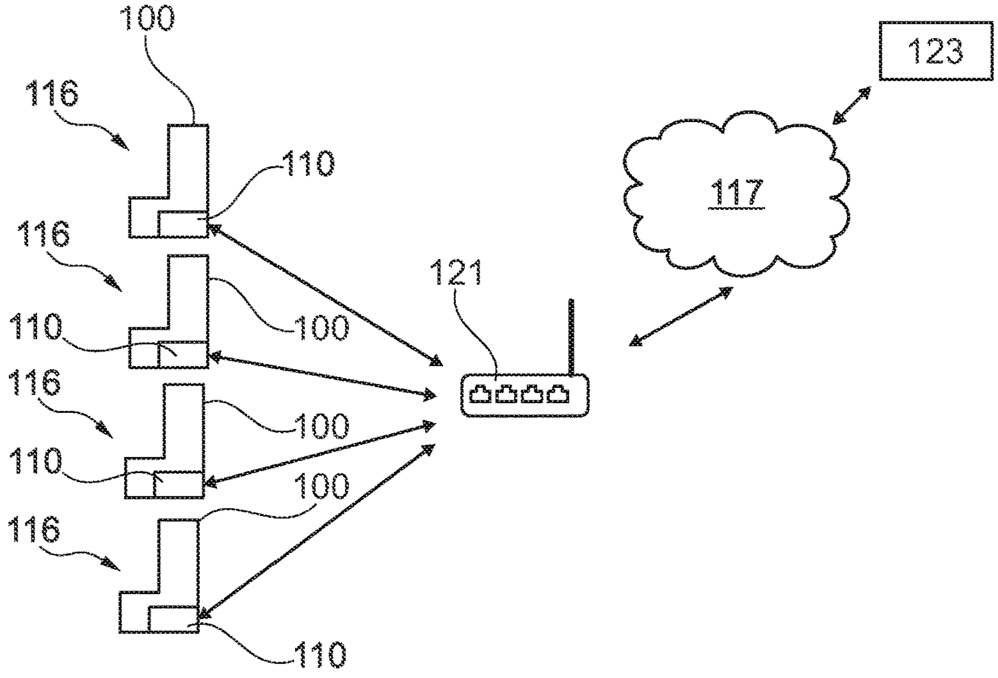
FIG. 3 shows a system with multiple refill arrangements according to an exemplary embodiment of the invention which are communicatively coupled with a reorder device.

FIG. 3 shows a system with multiple refill arrangements 116 according to an exemplary embodiment of the invention which are communicatively coupled with a reorder unit 123.

In the system according to FIG. 3, refill arrangements 116 with the above-described features are communicatively coupled with a node 121 (for example a gateway). The node 121 in turn is coupled via a communication network 117 with a reorder unit 123. When a control unit 110 and/or a scale 126 of a refill arrangement 116 recognizes that an active substance container 114 will be empty soon (for example since a residual filling of the active substance container 114 with an active substance fell below a certain threshold value), this information may be transmitted via the node 121 and the communication network 117 of the reorder unit 123, whereby a reorder of a new active substance container 114 with the active substance is triggered.

According to FIG. 3, consumption data with respect to the active substance may be transferred, for example to a Kanban-system. The transferred data may contain an identifier of a respective refill arrangement 116, an identifier of a dispenser can 104, a date and a time, and an active substance and a consumed and/or a reordered amount of the active substance. As illustrated, a node 121 may commonly function as a gateway for multiple refill arrangements 116. Software and in particular firmware may be installed at the refill arrangements 116, the nodes 121, and/or the reorder unit 123.

Figure 4:
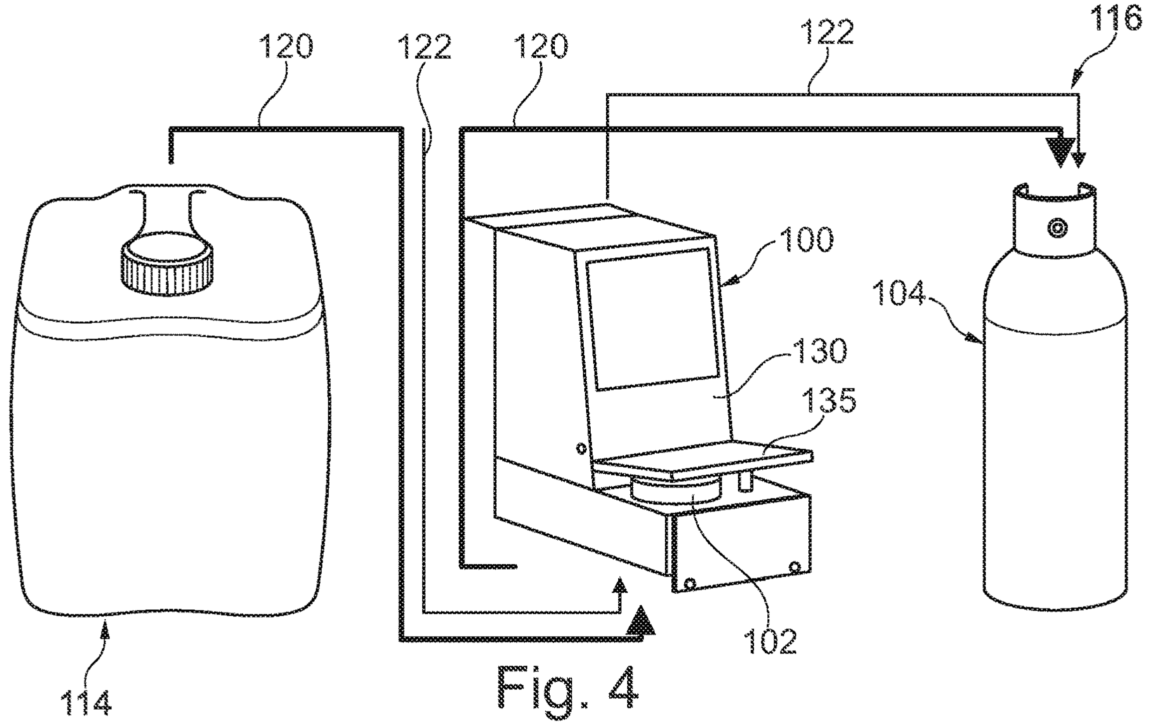
FIG. 4 shows a material flow in a refill arrangement with a refill station, an active substance container, and a dispenser can, according to an exemplary embodiment of the invention.

FIG. 4 shows a material flow in a refill arrangement 116 with a refill station 100, an active substance container 114, and a dispenser can 104, according to an exemplary embodiment of the invention.

The active substance may be transferred from the active substance container 114 via a supply unit 120 of the refill station 100 and from there to the dispenser can 104 which is mounted at a receiving device 102 after upwardly tilting a cover 135. The pressure gas may be transferred from a pressure gas reservoir via a supply unit 122 of the refill station 100 and from there to a dispenser can 104 which is mounted at the receiving device 102. If the dispenser can 104 is a BoV-dispenser can, refilling the pressure gas is dispensable.

Figure 5:
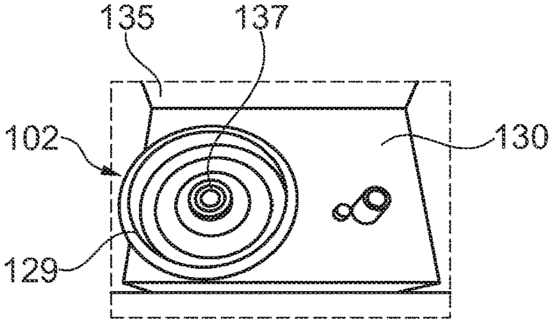
FIG. 5 shows a receiving device of a refill station according to an exemplary embodiment of the invention.

FIG. 5 shows a receiving device 102 of a refill station 100 according to an exemplary embodiment of the invention.

Figure 6:
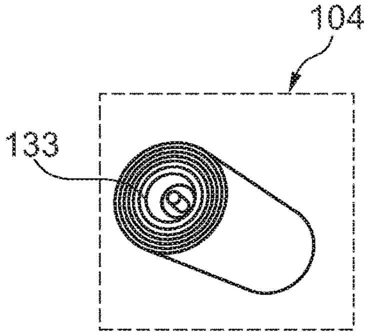
FIG. 6 shows a bottom of a dispenser can of a refill arrangement according to an exemplary embodiment of the invention.

FIG. 6 shows a bottom of a dispenser can 104 which is to be mounted at the receiving device 102 according to FIG. 5 of a refill arrangement 116 according to an exemplary embodiment of the invention.

At the receiving device 102, a coding plate 129 for receiving a bottom region 133 of the dispenser can 104 is formed. The coding plate 129 is formed mechanically complementary to the bottom region 133 of the dispenser can 104 (see FIG. 6). The coding plate 129 may be exposed by upwardly tilting a flap or a cover 135 according to FIG. 4. In a central region of the coding plate 129, a fluid terminal 137 is illustrated, which can be fluidically coupled with a refill valve 162 of the dispenser can 104, to refill the active substance and/or pressure gas through the refill valve 162 into the dispenser can 104 through the fluid terminal 137.

After mounting the dispenser can 104 at the coding plate 129, a locking unit for locking the dispenser can 104 at the coding plate 129 may be actuated, to prevent an undesired release of the dispenser can 104 from the receiving device 102 during the refill process. After finishing the refill process, the dispenser can 104 may be unlocked and removed from the receiving device 102.

Figure 7:
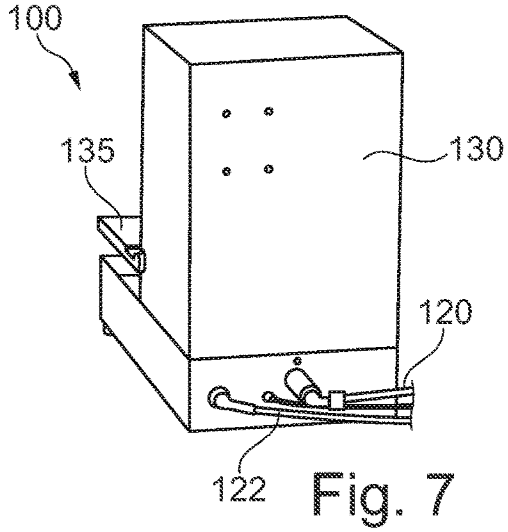
FIG. 7 shows a backside of a refill station according to an exemplary embodiment of the invention.

FIG. 7 shows a backside of a refill station 100 according to an exemplary embodiment of the invention. In particular, in FIG. 7, portions of the supply units 120, 122 are shown.

Figure 8:
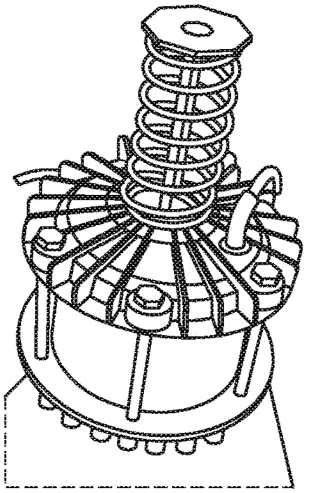
FIG. 8 shows a mechanism for refilling a dispenser can in a refill arrangement according to an exemplary embodiment of the invention.

FIG. 8 shows a mechanism for refilling a dispenser can 104 in a refill arrangement 116 according to an exemplary embodiment of the invention. Said mechanism contains a piston and a cylinder of a predetermined size, such that, by a suitable pressure, a filling amount to be dosed is definable.

Figure 9:
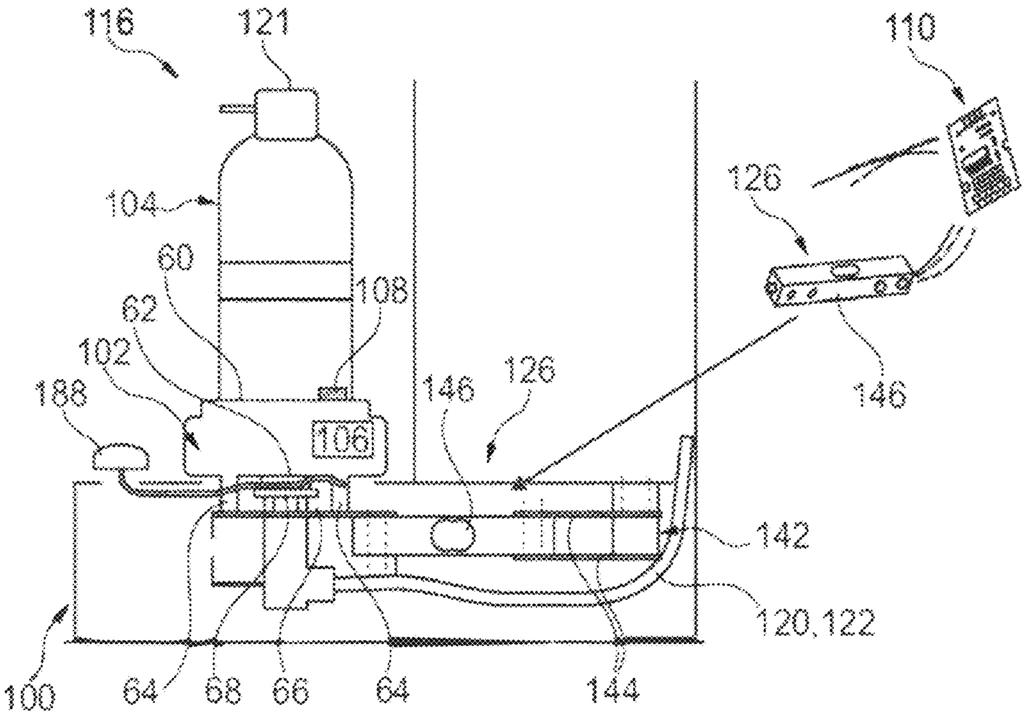
FIG. 9 shows a scale at a refill station according to an exemplary embodiment of the invention.

FIG. 9 shows a scale 126 at a refill station 100 according to an exemplary embodiment of the invention.

In more detail, FIG. 9 shows a refill arrangement 116 with the refill station 100 and a dispenser can 104 which is attached to a receiving device 102 of the refill station 100. The dispenser can 104 may be placed on the receiving device 102 and thereby laches. By an active substance container which is not illustrated in FIG. 9 (compare reference sign 114 in FIG. 1 or FIG. 4), the active substance may be refilled into the dispenser can 104 and/or by a gas reservoir which is not illustrated in FIG. 9 (compare reference sign 124 in FIG. 1), the pressure gas may be refilled into the dispenser can 104 via supply units 120 and/or 122 and via the receiving device 102. After finishing a refill process, a user may actuate an unlocking button 188, whereby the dispenser can 104 is unlocked from the receiving device 102. Alternatively, unlocking the dispenser can 104 from the receiving device 102 may be causable by merely exerting a tensile force on the dispenser can 104 which is received at the receiving device 102. The supply units 120 and/or 122 function as active substance conduit and/or pressure gas conduit and may be connected to a pump which is not illustrated in FIG. 9 (which may exert a pressure of up to 2 bar or even of up to 6 bar, for example, to supply the medium to the dispenser can 104 under pressure).

By the scale 126, in the context of a refill operation of the refill arrangement 116 for refilling the dispenser can 104 with the active substance (and optionally additionally with a pressure gas), a weight information which is related to the dispenser can 104 at the receiving device 102 can be captured. Since the scale 126 is attached to the receiving device 102 according to FIG. 9, to which in turn the dispenser can 104 to be refilled is mounted, the scale 126 determines a mass and/or a weight which includes the individual weights of the empty dispenser can 104, a possibly partial or complete filling of the dispenser can 104 with the active substance and/or the pressure gas, and the receiving device 102.

Advantageously, the scale 126 serves for capturing a weight information which is related to the dispenser can 104 at the receiving device 102 prior to a refill process and during a refill process. A control unit 110 of the refill station 100 is configured for controlling a refill of the dispenser can 104 with the active substance based on said captured weight information. According to FIG. 9, the scale 126 is arranged below the receiving device 102. The dispenser can 104 may be placed by a user from above on the receiving device 102 for refilling with the active substance and/or the pressure gas and may be arranged in an upright manner in a state received at the receiving device 102, i.e., with an actuation nozzle 121 which is oriented upwardly.

According to FIG. 9, the scale 126 is configured as a mechanically simply constructed and robust beam scale. Descriptively, the mechanical coupling of the scale 126 and the disk-shaped receiving device 102 may be denoted as disk-on-beam-construction. The beam-shaped scale 126 comprises a securing mechanism 142 which is configured for the protection against an overload of the scale 126. The securing mechanism 142 includes a double leaf spring 144 which is attached to one end of the weighting beam 146 of the scale 126. The end is opposing to another end of the weighting beam 146, wherein the other end is force-coupled with the receiving device 102 and—in a state received at the receiving device 102—with the dispenser can 104. The described securing mechanism 142 serves for protecting the scale 126 if an excessive weight is applied.

Preferably, the receiving device 102 comprises a receiving side 60 for detachably receiving the dispenser can 104 and a weighting side 62 which is opposing to the receiving side 60. At the weighting side 62, the scale 126 and a supply terminal 68 are attached for supplying the active substance and/or a pressure gas to the dispenser can 104 which is to be received at the receiving side 60. The spatial decoupling of the dispenser can mounting from the supply of the medium and from the weight determination protects the scale 126 and the supply terminal 168 against a mechanical load in connection with the user-sided attachment and detachment of a dispenser can 104 to be refilled with respect to the receiving device 102. As a constructively especially simple measure which leads to an error-robust refill station 100 at the same time, the receiving device 102 may be equipped at the weighting side 62 with a rigid protrusion 64 (preferably a ring-protrusion) to which the scale 126 is attached. At the same time, in the interior of the protrusion 64, a recess 66 is delimited, through which the supply terminal 68 is guided.

According to the embodiment of FIG. 9, the control unit 110 is configured for determining a possible residual filling of the dispenser can 104 prior to a refill process based on a weight information which is determined prior to the refill process by the scale 126, and for controlling the refill process based on this weight information. By, prior to the refill, detecting a residual filling of the dispenser can 104 with the active substance and/or of the pressure gas, both an undesired underfilling and a dangerous overfilling of the dispenser can 104 during the refill may be avoided. Therefore, by the weight-based control of the refill process of the dispenser can 104, on the one hand it may be avoided that the refill process is finished before the dispenser can 104 is substantially completely filled with the active substance and/or the pressure gas. This increases the user comfort, since an excessively frequent refill of the dispenser can 104 is thereby dispensable. At the same time, by the weight-based control of the refill process it may be avoided that the dispenser can 104 is overfilled with the active substance and/or the pressure gas which may lead to an excessive interior pressure of the dispenser can 104 and, under unfavorable circumstances, even to a risk for explosion and/or a leakage of aggressive chemicals out of the dispenser can 104. The prevention of the overfilling of the dispenser can 104 thus causes a high operational safety for a user and protects him against possibly hazardous chemicals of the active substance.

Preferably, the control unit 110 may be configured for continuously determining the weight information during a refill process by the scale 126, and for subsequently successively controlling, adapting, or regulating the refill process based on this weight information. In particular, the control unit 110 may be configured for controlling a refill process based on a differential weight determination of the dispenser can 104 which is performed by the scale 126 prior to, during, and/or at the end of the refill process. It has turned out as especially advantageous, when the scale 126 provides a weight information which is indicative for a sum weight of the dispenser can 104, a residual filling of the active substance in the dispenser can 104, and the receiving device 102 which is carrying the dispenser can 104, prior to a refill process and during a refill process. The refill process may then be precisely performed by the control unit 110 based on this information. In particular, the control unit 110 may be configured, based on a capturing of the weight information by the scale 126, for determining a residual amount of the active substance in the dispenser can 104 prior to a refill process, and for correspondingly controlling a subsequent refill process.

It is also especially advantageous to attach in the receiving device 102 a transponder reading device 106 which is for example configured as RFID reading device for reading dispenser can-related data of a dispenser can transponder 108 which is attached to the dispenser can 104 and which is configured as an RFID-tag. When the dispenser can 104 is attached to the receiving device 102 for refilling, the dispenser can transponder 108 may be brought in a readability distance of the transponder reading device 106, such that the transponder reading device 106 can read dispenser can-related data out of the dispenser can transponder 108. For example, such dispenser can-related data may be an empty weight of the dispenser can 104, an active substance to be refilled into the dispenser can 104, and/or a maximum filling amount of the dispenser can 104.

Advantageously, the control unit 110 may consider the read dispenser can-related data for characterizing the dispenser can 104 when controlling the refill of the dispenser can 104 with the active substance and/or the pressure gas. The control unit 110 may comprise a processor (for example a CPU, central processing unit), for example, which performs both a control of the scale 126 and a procedure control for the refill process. Moreover, the control unit 110 may fulfill further functions, in particular controlling a pump for the medium supply to the dispenser can 104 via the supply units 120, 122, controlling a communication which is described according to FIG. 1 and/or FIG. 3 via a communication network 117, such as the Internet, and/or controlling a display unit 118 (compare FIG. 1).

In the following, it is exemplarily described how on basis of the measuring data of the scale 126, preferably in combination with the read dispenser can-related data, a refill process for refilling a dispenser can 104 with initially unknown residual filling can be performed:

After a user has mounted a dispenser can 104 with an unknown residual filling of the active substance and/or the pressure gas on the receiving device 102, the scale 126 may capture a sum weight of the empty weight of the dispenser can 104, the weight of its residual filling, and the weight of the receiving device 102. For example, the empty weight of the dispenser can 104 may be pre-known or may be read as dispenser can-related data out of the dispenser can transponder 108. The weight of the receiving device 102 may be pre-known or may be determined without a placed dispenser can 104 by the scale 126, for example during a calibration. Then, on basis of this information, it is possible to determine a residual filling of the dispenser can 104 by forming a difference between the captured sum weights on the one hand and the empty weight of the receiving device 102 and the dispenser can 104 on the other hand. A target filling of the dispenser can 104 in its completely filled state may be predetermined or may be read as dispenser can-related data out of the dispenser can transponder 108. By determining the difference between the target filling and the residual filling, it may be determined which filling amount shall be filled for refilling the dispenser can 104, to neither underfill nor overfill the dispenser can 104. This filling amount may then be filled into the dispenser can 104, controlled by the control unit 110. Alternatively, the complete filling of the dispenser can 104 may also be guaranteed by continuously or regularly measuring the sum weight during performing the refill by the scale 126, and by forming the difference between an actual partial filling (i.e. a successively increased residual filling) and the target filling, it is determined how long the filling process shall be continued. If the difference between an actual filling and the target filling is zero, the dispenser can 104 is completely refilled, and the refill process can be terminated.

Figure 10:
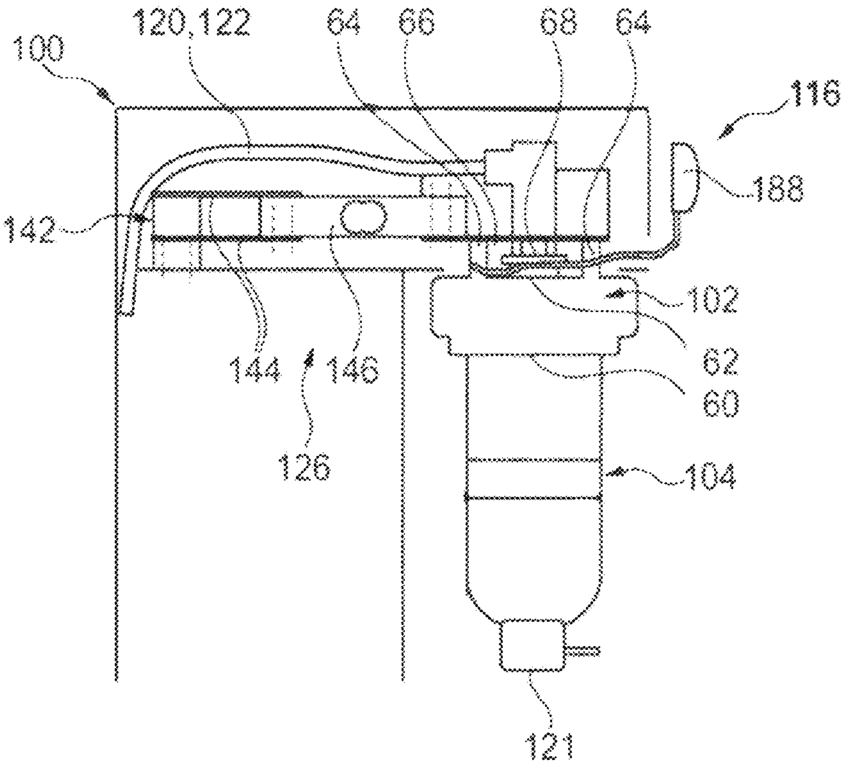
FIG. 10 shows a scale at a refill station according to another exemplary embodiment of the invention.

FIG. 10 shows a scale 126 at a refill station 100 according to another exemplary embodiment of the invention.

The embodiment according to FIG. 10 differs from the embodiment according to FIG. 9 in particular in that, according to FIG. 10, the scale 126 is arranged above the receiving device 102. According to FIG. 10, the dispenser can 104 in a state received at the receiving device 102 is arranged upside down, i.e. is placed on the receiving device 102 in a downwardly suspending manner. The actuation nozzle 121 of the dispenser can 104 is directed downwardly. In other words, the orientation of the dispenser can 104 according to FIG. 10 in its configuration attached to the receiving device 102 is rotated around 180° with respect to the orientation according to FIG. 9.

Supplementary it is to be noted that "comprising" does not exclude other elements or steps and "a" or "an" does not exclude a plurality. Furthermore, it is noted that features or steps which are described with reference to one of the above embodiments may also be used in combination with other features or steps of other above-described embodiments. Reference signs in the claims are not to be construed as limitation.

The invention claimed is:

1. Refill station comprising:

a receiving device for receiving a dispenser can which is to be refilled with an active substance, the receiving device comprises a receiving side for receiving the dispenser can and a weighting side which is opposing to the receiving side;

a scale for capturing a weight information which is related to the dispenser can at the receiving device prior to a refill process or during a refill process;

control unit which is configured for controlling a refill of the dispenser can with the active substance based on the captured weight information; and a supply terminal for supplying the active substance or a pressure gas to the dispenser can, wherein the scale and the supply terminal are attached at the weighting side.

2. Refill station according to claim 1, wherein the scale is arranged below the receiving device, and the dispenser can, in a state received at the receiving device, is arranged in an upright manner.

3. Refill station according to claim 1, wherein the scale is arranged above the receiving device, and the dispenser can, in a state received at the receiving device, is arranged upside down.

4. Refill station according to claim 1, wherein the scale is a beam scale.

5. Refill station according to claim 1, wherein the scale comprises a securing mechanism which provides a protection against an overload of the scale.

6. Refill station according to claim 5, wherein the securing mechanism comprises a double leaf spring which is attached to an end of a weighting beam of the scale which is opposing to another end of the weighting beam, wherein the other end, in a state received at the receiving device, is force-coupled with the dispenser can.

7. Refill station according to claim 1, wherein the control unit is configured for determining a residual filling of the dispenser can prior to a refill process based on a weight information which is determined by the scale prior to the refill process, and for controlling the refill process based on this weight information.

8. Refill station according to claim 1, wherein the control unit is configured for determining the weight information by the scale during a refill process, and for subsequently continuing the refill process based on this weight information.

9. Refill station according to claim 1, wherein the control unit is configured for controlling a refill process based on a differential weight determination of the dispenser can which is performed by the scale prior to the refill process and after at least a part of the refill process.

10. Refill station according to claim 1, wherein the scale is configured for capturing a weight information which is indicative for a sum weight of the dispenser can, a residual filling of the dispenser can, and a part of the refill station, prior to a refill process or during a refill process.

11. Refill station according to claim 1, comprising a transponder reading device for reading dispenser can-related data of a dispenser can transponder which is assigned to the dispenser can;

wherein the control unit is configured for controlling the refill of the dispenser can with the active substance based on the read dispenser can- related data.

12. Refill station according to claim 11, wherein the transponder reading device is configured for reading dispenser can-related data which are indicative for an empty weight of the dispenser can, an active substance which is to be filled into the dispenser can, or a maximum filling amount of the dispenser can.

13. Refill station according to claim 1, wherein the receiving device comprises a protrusion at the weighting side, to which the scale is attached, and which delimits a recess through which the supply terminal is guided.

14. Refill arrangement comprising:

a refill station according to claim 1; and a dispenser can which is attachable or attached to the receiving device, wherein, by the scale, a weight information which is related to the dispenser can at the receiving device is capturable, when the dispenser can is attached to the receiving device.

15. Refill arrangement according to claim 14, comprising an active substance container which contains an active substance, and which is coupled or couplable with the receiving device, to provide the active substance for refilling the dispenser can.

16. Refill arrangement according to claim 14, comprising a gas reservoir which is configured for providing the pressure gas, and which is coupled or couplable with the receiving device, to provide the pressure gas for refilling the dispenser can.

17. Method for operating a refill station, wherein the method comprises: using the refill station according to claim 1;

receiving the dispenser can which is to be refilled with the active substance at the receiving device of the refill station;

capturing the weight information which is related to the dispenser can at the receiving device prior to a refill process or during a refill process by the scale; and controlling the refill of the dispenser can with the active substance based on the captured weight information.

* * * * *